US005787157A

United States Patent [19]
Garfin et al.

[11] Patent Number: 5,787,157
[45] Date of Patent: Jul. 28, 1998

[54] GATEWAY DEVICE FOR TELECOMMUNICATION STATION

[75] Inventors: Susan Garfin, Suite 2000 393 University Avenue, Toronto, Ontario, M5G 1E6, Canada; Patrick De Angelis, Oakville, Canada

[73] Assignee: Susan Garfin, Toronto, Canada

[21] Appl. No.: 823,205

[22] Filed: Mar. 24, 1997

Related U.S. Application Data

[63] Continuation-in-part of Ser. No. 492,453, Jun. 20, 1995, abandoned.

[51] Int. Cl.[6] .................. H04M 15/00; H04M 15/06; H04M 3/00
[52] U.S. Cl. .................. 379/142; 379/127; 379/245; 379/376; 455/414; 455/415
[58] Field of Search .................. 379/127, 142, 379/245, 246, 376; 455/414, 415, 426

[56] References Cited

U.S. PATENT DOCUMENTS

| | | | |
|---|---|---|---|
| 5,390,233 | 2/1995 | Jensen et al. | 379/142 |
| 5,559,860 | 9/1996 | Mizikovsky | 379/142 |
| 5,581,599 | 12/1996 | Tsuji et al. | 379/142 |

Primary Examiner—Steven J. Saras
Assistant Examiner—Vijay Shankar
Attorney, Agent, or Firm—Dowell & Dowell, P.C.

[57] ABSTRACT

A gateway device for controlling the admission of telephone calls from a telephone line to a telecommunication station which includes a telephone call identification device; a micro controller operatively connectable to the telephone line through the telephone call identification device and to a telecommunication station on the telephone line, the micro controller being programmable to accept in memory a list of telephone call identification data and also having in memory instructions to summarily act on a telephone call identified by the call identification device that is included in the telephone call identification data; a command station for the micro controller; a device for two-way, radio-link connecting the micro controller and the command station to transmit information in the call identification device not summarily acted on as stated to the command station for visual display and for transmitting control commands from the command station to the micro controller, the command station having a visual display for telephone call identification in the call identification device; the micro controller having in memory a plurality of command instructions each to be carried out in response to its own control command from the command station; the command station having a control panel with a distinct manually operable control command initiator for each of the command instructions: one of the command instructions being to add the identification data of the telephone call currently in the telephone call identification device to the list of telephone call identification data in memory and to process the call as if it had previously been on the list in memory.

6 Claims, 1 Drawing Sheet

GATEWAY DEVICE FOR TELECOMMUNICATION STATION

BACKGROUND OF THE INVENTION

This invention relates to a gateway device for controlling the admission of telephone calls to a telefacsimile or other telecommunication station and it is a continuation in part of application Ser. No. 08/492,453 filed on the 20th day of Jun., 1995 is now abandoned. It will be described as used in association with a telefacsimile station.

Unsolicited telefacsimile communications, usually containing irrelevant advertising, are a constant annoyance in the operation of a telefacsimile machine. They tie up the availability of the machine for more urgent business, involve needless expense for paper and printing costs, unduly increase the office clutter and reduce office efficiency.

Telephone call signals have a call identification component and there are known telephone call identification devices that separate this component and display the identification of an incoming call on a screen close to the telephone. These devices notify the user of the call identification and, knowing this, the user can reject the call by quickly picking up and dropping the receiver. This is common practice in screening telephone calls but the same technique does not work for a telefacsimile machine. Telephone use depends on the ever-close presence of the user to the phone. It is not practice to have anyone close enough to a facsimile machine on a continuing basis to make this technique effective for telefacsimile. Moreover that method of screening would not work with facsimile because, on telephone, a call can be answered and quickly terminated. If a facsimile call were to be similarly answered, the machine would set in motion a long sequence of answering steps difficult to terminate.

There are also gateway devices available which employ a telephone identification receiver and a micro computer that is programable to accept in memory a list of telephone call identifications and also programable to accept in memory instructions to reject or accept telephone calls identified by the call identification receiver that are included on the list. They will reject or accept calls identified on the list, but they are not in very extensive use for facsimile because it is difficult to keep the list in memory up to date. Changing the list can only be done at suitable time intervals by entering the changes at the location of the device.

SUMMARY OF INVENTION

With the present invention it is possible to keep the memory list of telephone call identifications of the micro processor up to date with little effort from a remote location by programing the micro processor to respond to command instructions from a portable radio linked command station of a size that fits conveniently into a garment pocket on the basis of a review of the visual display of the call identification of the telephone call in the identification receiver. The command entry is simple and requires little attention and the command station can always be close to the person tending to the machine.

It is therefor an object of this invention to provide an efficient inexpensive gateway device for keeping a list of telephone call identifications on a micro computer up to date on a continuing basis.

It is a further object of the invention to provide such a device where the micro computer is programmed with command instructions each to be carried out in response to its own control command from a radio-linked command station.

With these and other objects in view a gateway device for controlling the admission of telephone calls from a telephone line to a telecommunication station according to one aspect of this invention has a telephone call identification means; a micro controller operatively connectable to the telephone line through the telephone call identification means and to a telecommunication station on the telephone line, said micro controller being programmable to accept in memory a list of telephone call identification data and also having in memory instructions to summarily act on a telephone call identified by said call identification means that is included in said telephone call identification data; a command station for the micro controller; means for two-way radio-link connecting said micro controller and said command station to transmit information in the call identification means not summarily acted on as aforesaid to the command station for visual display and for transmitting control commands from the command station to the micro controller, the command station having visual display means for telephone call identification in the call identification means; said micro controller having in memory a plurality of command instructions each to be carried out in response to its own control command from said command station; the command station having a control panel with a distinct manually operable control command initiator for each of the command instructions; one of the command instructions being to add the identification data of the telephone call currently in the telephone call identification means to the list of telephone call identification data in memory and to process the call as if it had previously been on the list in memory.

BRIEF DESCRIPTION OF THE DRAWINGS

The invention will be clearly understood after reference to the following detailed specification read in conjunction with the drawings.

In the drawings.

DESCRIPTION OF THE PREFERRED EMBODIMENT

Figure 1:
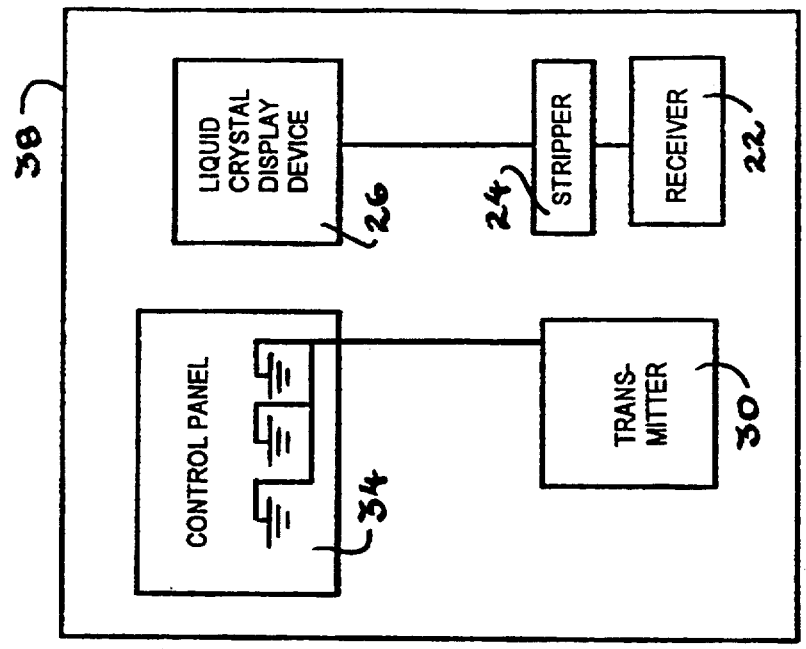
FIG. 1 is a block diagram showing the main components of a gateway device for controlling the admission of telephone calls from a telephone line to a telefacsimile station.
Figure 1:
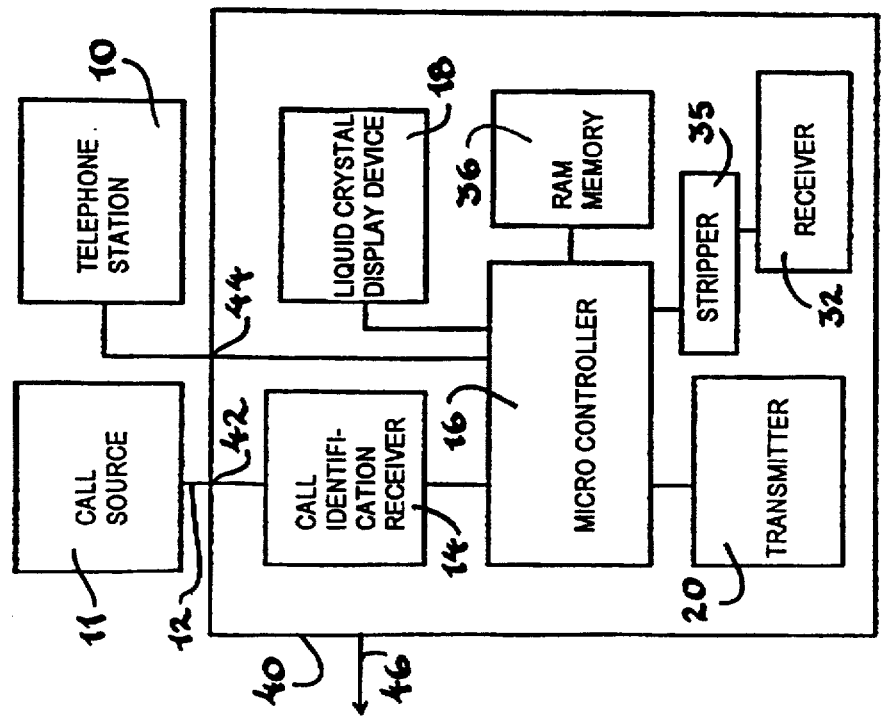

The drawings illustrate in block form a gateway device for controlling the admission of telephone calls from a call source 11 to a facsimile machine 10. The device has two casings, one indicated by the border 40 and the other indicated by the border 38. The casing 40 is hard wired to the telephone line 12 which is illustrated as originating from a call source 11. The casing 38 is a portable command station and, as will be explained later, is radio-link connected to the micro controller 16 of the casing 40.

Incoming telephone call signals on line 12 to the facsimile machine 10 have a component that identifies the calling source. They pass through a call identification receiver 14 that is able to identify this component and pass it to micro controller 16. Micro controller 16 is programmed to take the incoming digital source identifying component, convert it to analogue form and feed it to a liquid display device 18 that visually displays the identity of the call source 11 on the basis of the component characteristic at the telefacsimile machine. This information at this location is not of much use because there is seldom staff who can conveniently watch for calls at the location.

In the case of this invention, the analogue form of the signal component that identifies the source is conducted from the micro processor 16 to an FSK-FM radio channel transmitter 20 for radio channel transmission to an FSK-FM receiver 22, which is in the portable command station 38. The received signal is stripped of the FSK component in stripper 24 from which it passes to liquid display device 26 that displays the identification data of the call signal for the incoming call.

To have this information available at a location remote from the telephone set materially increases the utility of the concept of providing a visual read-out of the original of a call because it permits the person who carries the command station in a shirt pocket to constantly monitor the source identification data of calls without serious distraction from other duties and to issue control commands via radio-link to the micro computer to process the call on the telephone line for admittance to the telefacsimile machine 10.

In this latter respect, the apparatus at the command station includes an FSK-FM transmitter 30 which, when activated, transmits signals to a tuned receiver 32 at the location of the transmitter 20. Numeral 34 is a command control panel with three distinct manually operable initiator buttons. One button, when pressed causes transmitter 30 to send a signal to receiver 32 which in turn conducts it to micro controller 16 via FSK stripper 35 to cause the micro controller to operate command instructions which cause the incoming call to be rejected before it is answered by the machine. Another button, when pressed, causes a different signal to travel the same route to cause the micro controller to operate command instructions to accept the incoming call. The third button causes a signal to travel the same route to operate command instructions to add the identification of the telephone call currently in the telephone call identification means to list the telephone call identification data in memory and process the call as if it had previously been in memory. Thus, the call will be forever rejected.

That elements that are illustrated at the command station are all available in compact form and can be housed in a portable casing represented in the drawing by box 38 of a size that will conveniently fit in a shirt breast pocket. They can be conveniently powered by a small 1.5 volt AA battery (not shown in the schematic drawing).

The elements shown as hard-wire connected to the micro controller 16 are housed in a convenient casing such as that represented by box 40 with a socket as at 42 to receive a jack on line 12 and a socket as at 44 to receive the jack from facsimile machine 10. Number 46 is a cord for connecting the device to a standard AC power supply to supply power to the operating parts by way of appropriate DC converters not illustrated in the drawings.

All essential constituent basic elements are available on the open market and following is a list of suppliers of elements that work well in the device.

| PART | SUPPLIER | NUMBER |
| --- | --- | --- |
| Identification Receiver 14 | MOTOROLA CANADA LIMITED (trade name) | MC145447 |
| Micro Controller 16 | MICROCHIP TECHNOLOGY INC. (trade name) | P1C16C55 |
| Transmitter 20, 30 | MOTOROLA CANADA LIMITED (trade name) | MC2831A |
| Receiver 22, 32 | MOTOROLA CANADA LIMITED (trade name) | MC3367 |
| Stripper 24, 34 | MOTOROLA CANADA LIMITED (trade name) | MC145447 |

Programming of the micro-controller 16 is accomplished in assembly code in accordance with standard practice. It is known to program it with memory instructions to accept calls on the list of telephone calls identification data. This mode is suited for some purposes and, with appropriate command instructions, it can be effective to limit the accepted calls to a list subject to change by command instruction.

The invention has been described in association with a telefacsimile station but its use is contemplated in association with any other telecommunications type of station such as telephone, electronic mail or telex where problems of controlling access from the telephone line to the station arise.

Embodiments other than the one described will be apparent to those skilled in the art and it is not intended that the foregoing specification should be read in a limiting sense.

We claim:

1. A gateway device for controlling the admission of telephone calls from a telephone line to a telecommunication station having:

a telephone call identification means;

a micro controller operatively connectable to the telephone line through the telephone call identification means and to a telecommunication station on the telephone line, said micro controller being programmable to accept in memory a list of telephone call identification data and also having in memory instructions to summarily act on a telephone call identified by said call identification means that is included in said telephone call identification data;

a command station for the micro controller;

means for two-way, radio-link connecting said micro controller and said command station to transmit information in the call identification means not summarily acted on as aforesaid to the command station for visual display and for transmitting control commands from the command station to the micro controller, said command station having visual display means for telephone call identification in the call identification means;

said micro controller having in memory a plurality of command instructions each to be carried out in response to its own control command from said command station;

said command station having a control panel with a distinct manually operable control command initiator for each of said command instructions;

one of said command instructions being to add the identification data of the telephone call currently in the telephone call identification means to the list of telephone call identification data in memory and to process the call as if it had previously been on the list in memory.

2. A gateway device for controlling the admission of telephone calls from a telephone line to a telecommunication station as claimed in claim 1 in which said in memory instructions to summarily act on a telephone call identified by said call identification receiver that is included on said list of telephone calls accepted in memory are to reject the call.

3. A gateway device for controlling the admission of telephone calls from a telephone line to a telecommunication station as claimed in claim 1 in which said in memory instructions to summarily act on a telephone call identified by said call identification receiver that is included on said list of telephone calls accepted in memory are to accept the call.

4. A gateway device for controlling the admission of telephone calls from a telephone line to a telecommunication station as claimed in claim 1 in which said command station is portable and of a size to be carried in a garment pocket.

5. A gateway device for controlling the admission of telephone calls from a telephone line to a telecommunication station as claimed in claim 2 in which said command station is portable and of a size to be carried in a garment pocket.

6. A gateway device for controlling the admission of telephone calls from a telephone line to a telecommunication station as claimed in claim 3 in which said command station is portable and of a size to be carried in a garment pocket.

* * * * *